United States Patent
Kling et al.

(10) Patent No.: US 10,352,236 B2
(45) Date of Patent: Jul. 16, 2019

(54) NOSECAP

(71) Applicant: UNITED TECHNOLOGIES CORPORATION, Farmington, CT (US)

(72) Inventors: Colin J. Kling, Newington, CT (US); Charles W. Brown, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 498 days.

(21) Appl. No.: 15/032,517

(22) PCT Filed: Oct. 15, 2014

(86) PCT No.: PCT/US2014/060686
§ 371 (c)(1),
(2) Date: Apr. 27, 2016

(87) PCT Pub. No.: WO2015/065712
PCT Pub. Date: May 7, 2015

(65) Prior Publication Data
US 2016/0273451 A1    Sep. 22, 2016

Related U.S. Application Data

(60) Provisional application No. 61/897,650, filed on Oct. 30, 2013.

(51) Int. Cl.
*F02C 7/04* (2006.01)
*B29C 45/00* (2006.01)
*B64C 11/14* (2006.01)

(52) U.S. Cl.
CPC ............... *F02C 7/04* (2013.01); *B29C 45/00* (2013.01); *B64C 11/14* (2013.01);
(Continued)

(58) Field of Classification Search
CPC ..... B29C 45/00; B29C 45/0001; B64C 11/14; F05D 2230/72; F05D 2250/73;
(Continued)

(56) References Cited

U.S. PATENT DOCUMENTS 3,799,693 A    3/1974   Hull
4,774,150 A *  9/1988   Amano .................... C23C 4/02
                                                116/200
(Continued)

FOREIGN PATENT DOCUMENTS

EP    1136353 A2    9/2001
FR    3799693 A1    10/2013
(Continued)

OTHER PUBLICATIONS

European Search Report for Application No. EP 14 85 9281.
(Continued)

*Primary Examiner* — Carlos A Rivera
*Assistant Examiner* — Justin A Pruitt
(74) *Attorney, Agent, or Firm* — Cantor Colburn LLP

(57) ABSTRACT

The present disclosure relates generally to a nosecap for a gas turbine engine. The nosecap may be injection molded in an embodiment. The nosecap may have bolt holes surrounded by bolt pockets that are asymmetric about a plane passing through a geometric center of the nosecap and passing through and dividing the bolt hole in an embodiment.

20 Claims, 6 Drawing Sheets

(52) U.S. Cl.
CPC ...... *F05D 2230/72* (2013.01); *F05D 2250/73* (2013.01); *F05D 2300/43* (2013.01); *F05D 2300/433* (2013.01); *F05D 2300/436* (2013.01)

(58) Field of Classification Search
CPC .......... F05D 2300/43; F05D 2300/433; F05D 2300/434; F05D 2300/436; F01D 25/28; F01D 25/243
USPC .......................................................... 416/61
See application file for complete search history.

(56) References Cited

U.S. PATENT DOCUMENTS

| | | | | |
|---|---|---|---|---|
| 4,886,009 A | * | 12/1989 | Gondar | B23D 51/025 |
| | | | | 116/208 |
| 5,182,906 A | | 2/1993 | Gilchrist et al. | |
| 5,252,160 A | | 10/1993 | Scanlon et al. | |
| 6,358,014 B1 | * | 3/2002 | Chou | B64C 11/14 |
| | | | | 29/889.1 |
| 6,368,066 B2 | * | 4/2002 | Aiyama | F04D 29/403 |
| | | | | 15/339 |
| 9,371,839 B2 | | 6/2016 | Houradou | |
| 2010/0322782 A1 | * | 12/2010 | Welch | F02C 7/04 |
| | | | | 416/244 R |
| 2012/0060594 A1 | | 3/2012 | Care et al. | |
| 2013/0255277 A1 | | 10/2013 | Macchia et al. | |
| 2015/0204207 A1 | * | 7/2015 | Bulat | F01D 21/003 |
| | | | | 416/1 |
| 2016/0061050 A1 | * | 3/2016 | Keenan | F01D 11/122 |
| | | | | 415/118 |

FOREIGN PATENT DOCUMENTS

| | | |
|---|---|---|
| GB | 2160467 A | 12/1985 |
| WO | 0220349 A1 | 3/2002 |

OTHER PUBLICATIONS

International Search Report for International application No. PCT/US2014/060686; International filing date: Oct. 15, 2014; dated Jan. 29, 2015; 3 pgs.

International Written Opinion for International application No. PCT/US2014/060686; International filing date: Oct. 15, 2014; dated Jan. 29, 2015; 6 pgs.

* cited by examiner

NOSECAP

CROSS-REFERENCE TO RELATED APPLICATIONS

The present application claims the benefit of and incorporates by reference herein the disclosure of U.S. Ser. No. 61/897,650 filed Oct. 30, 2013.

TECHNICAL FIELD OF THE DISCLOSURE

The present disclosure is generally related to gas turbine engines and, more specifically, to a nosecap for a gas turbine engine.

BACKGROUND OF THE DISCLOSURE

A nosecap for a gas turbine engine is schematically illustrated in FIG. 1 and indicated generally at 10. In a gas turbine engine, the nosecap 10 is disposed in the flowpath forward of the engine spinner cone and is bolted to the spinner cone through a plurality of bolt holes 12. The bolts (not shown) are oriented axially and are recessed from the flowpath in bolt pockets 14 near the aft edge of the nosecap 10. Each bolt pocket 14 includes a leading edge wall 15, a trailing edge wall 16, and a transition area wall 17 disposed between the leading edge wall 15 and the trailing edge wall 16. The transition area wall 17 is disposed at a fixed radius from a center of the bolt hole 12. The leading edge wall 15 and the trailing edge wall 16 comprise straight wall segments extending from the transition area wall 17. The bolt pocket 14 of the nosecap 10 is symmetric about a plane 19 passing through the geometric center 18 of the nosecap 10 and passing through and dividing the bolt hole 12. Most nosecaps 10 are formed from a poly-paraphenylene terephthalamide (such as that sold under the brand Kevlar®) and fiberglass two-dimensional laminate construction with a fluoroelastomer erosion coating.

Nosecaps 10 are designed to resist erosion and withstand hail strike without sustaining damage or experiencing large deflections. During medium and large birdstrike events, the nosecap 10 typically liberates and is considered frangible. It is ingested into the fan of the engine and expelled from the exhaust of the engine, causing no downstream economic damage.

The nosecap 10 is expensive due to the manual labor required in the nosecap 10 construction layup process and the raw material cost. Additionally, the nosecap 10 geometry is somewhat limited by the manufacturing process which, for example, requires large, smooth radii and gentle changes in part curvature.

The nosecap 10 exhibits erosion damage on the trailing edge wall 16 of the bolt pocket 14. This surface receives particle impact velocity that is the vector sum of the aircraft velocity and the rotational velocity of the nosecap 10 at that radius. Erosion at this location is typically worse than any other location on the nosecap 10.

Therefore, improvements in gas turbine engine nosecaps are still needed in the art.

SUMMARY OF THE DISCLOSURE

In one embodiment, a nosecap for a gas turbine engine is disclosed, the nosecap comprising an injection molded body having a forward surface and an aft surface separated by an edge.

In another embodiment, a nosecap for a gas turbine engine is disclosed, comprising: a body having a forward surface and an aft surface separated by an edge; at least one bolt hole formed through the body; and at least one bolt pocket, each at least one bolt pocket extending from the edge and surrounding a respective one of the at least one bolt hole; wherein at least one of the at least one bolt pockets is asymmetric about a plane passing through a geometric center of the body and passing through and dividing the respective one of the at least one bolt hole.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
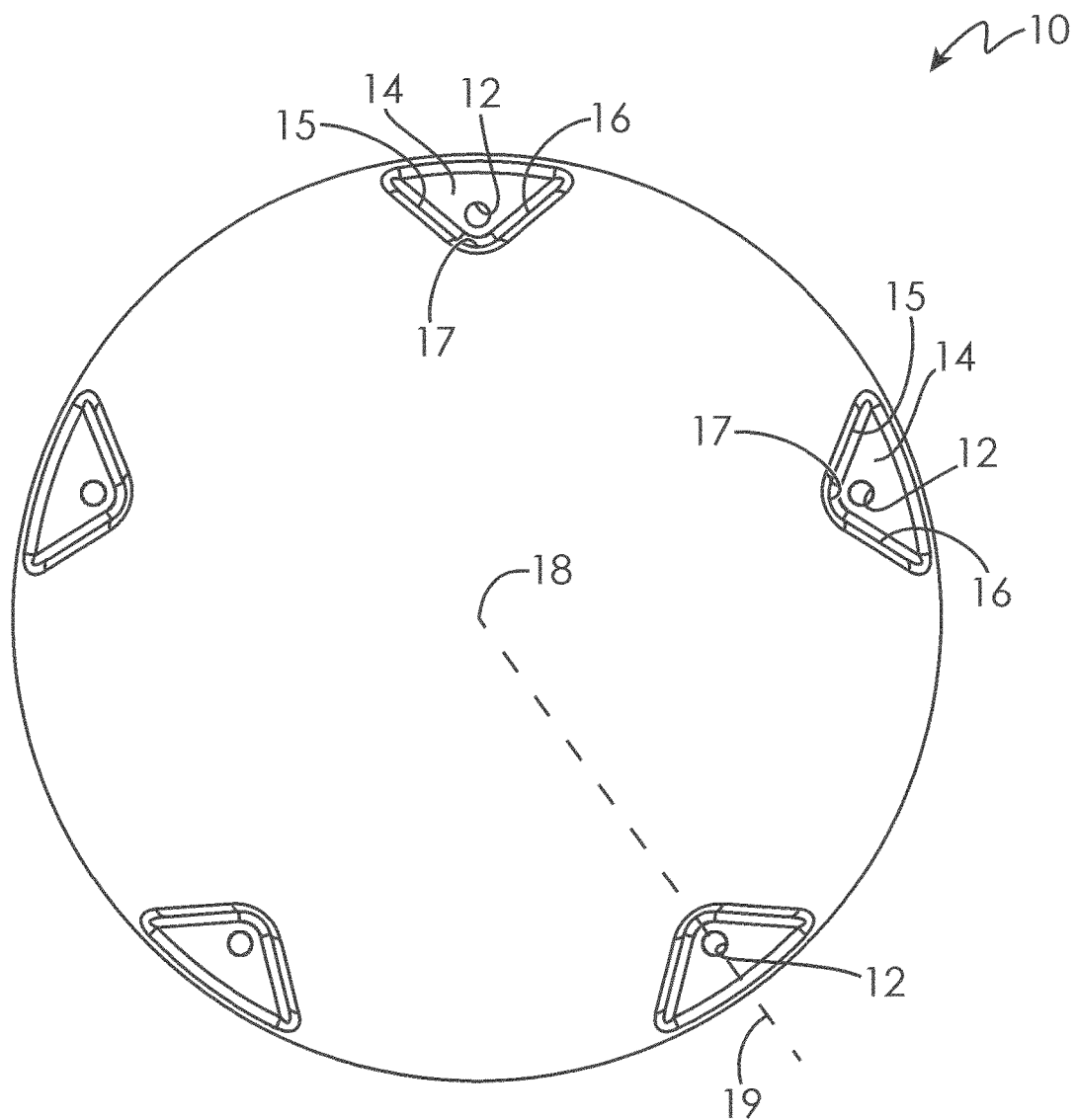
FIG. 1 is a schematic elevational view of a gas turbine engine nosecap in an embodiment.
Figure 2:
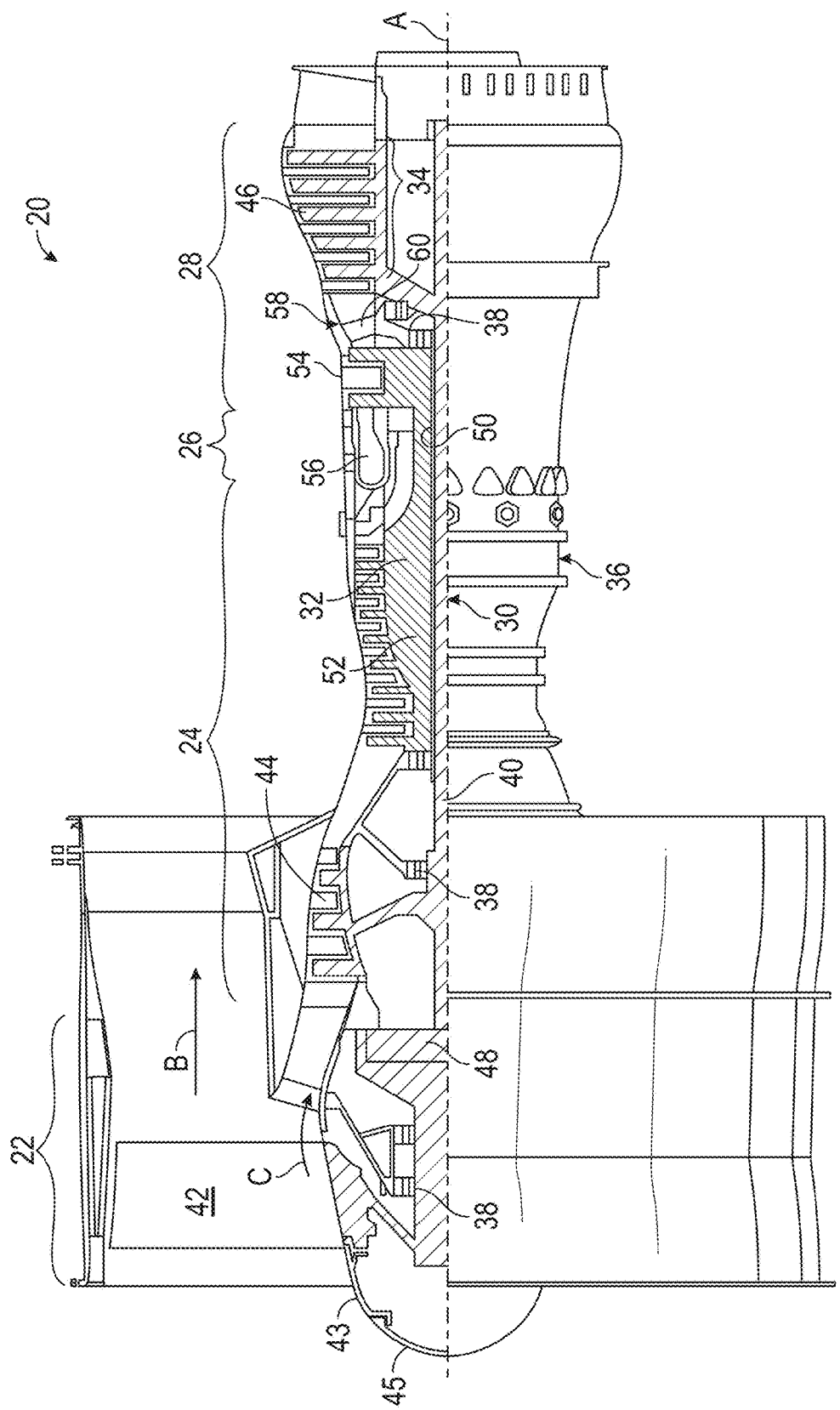
FIG. 2 is a schematic partial cross-sectional view of a gas turbine engine in an embodiment.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. A spinner cone 43 is covered on the forward side by a nosecap 45. The spinner cone 43/nosecap 45 together close the forward end of the engine 20. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7°R)]^{0.5}$. The "Low corrected fan tip speed" as disclosed herein according to one non-limiting embodiment is less than about 1150 ft/second.

Figure 3:
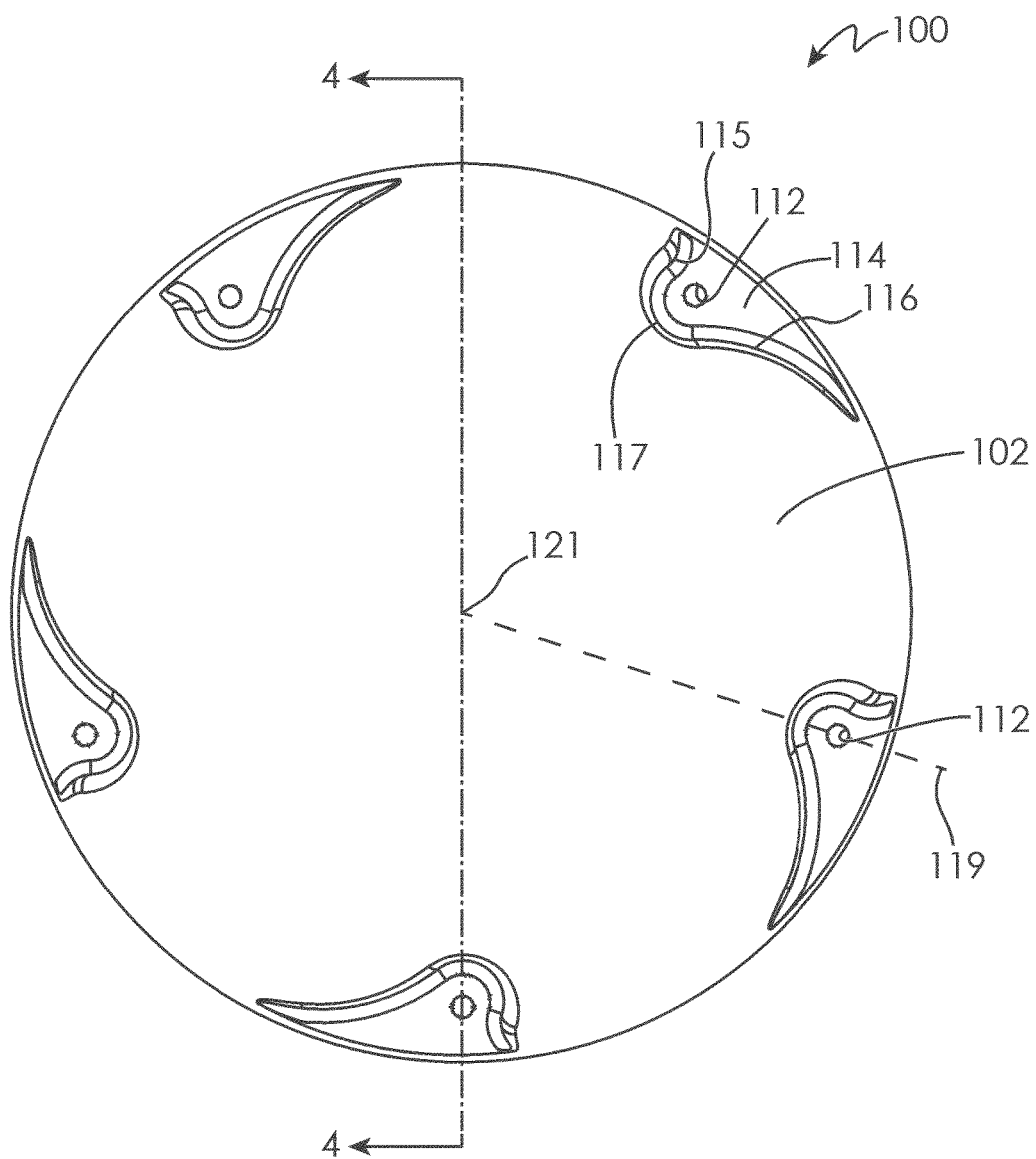
FIG. 3 is a schematic elevational view of a gas turbine engine nosecap in an embodiment.
Figure 4:
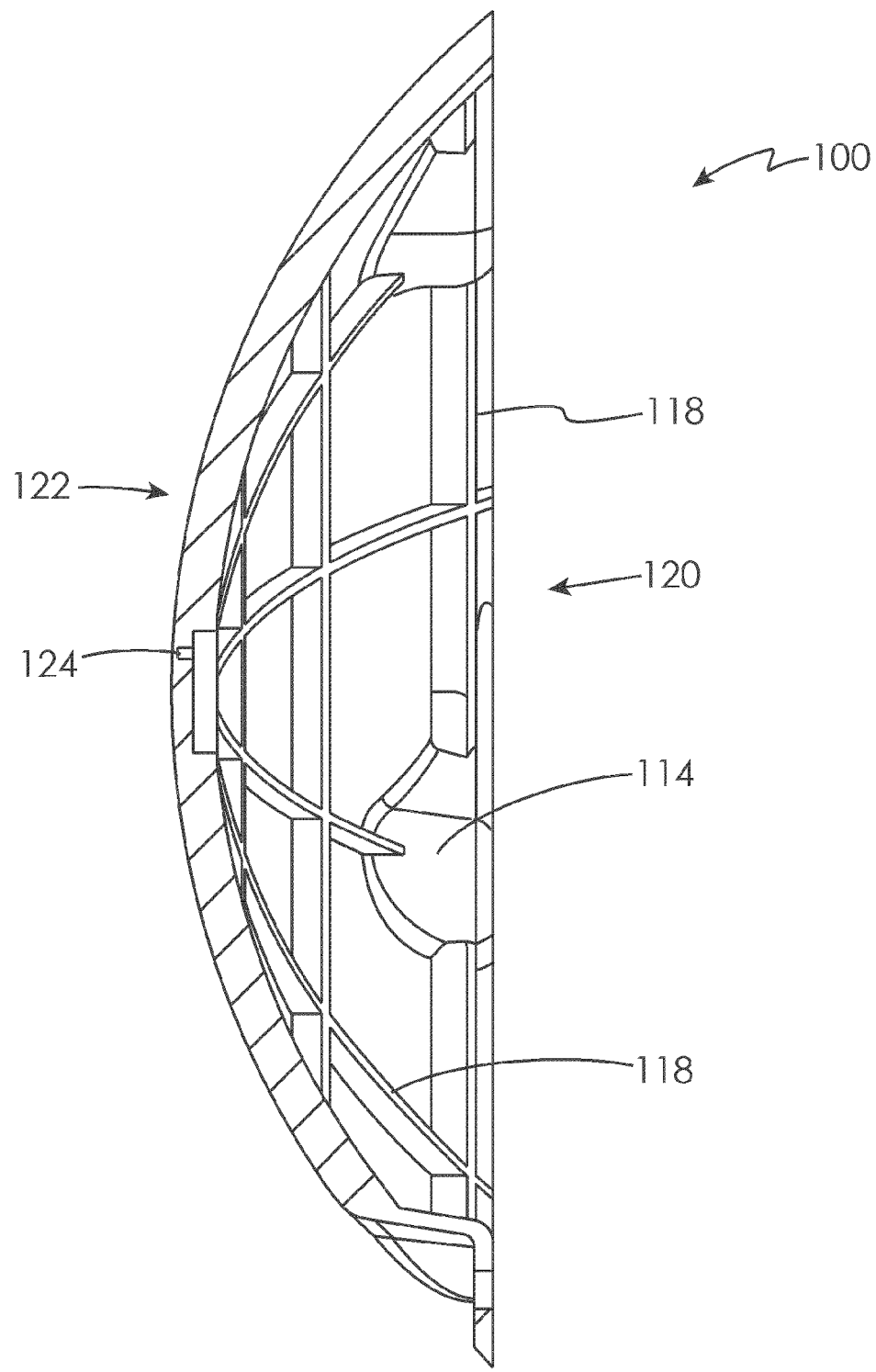
FIG. 4 is a schematic cross-sectional view of a gas turbine engine nosecap in an embodiment.
Figure 5:
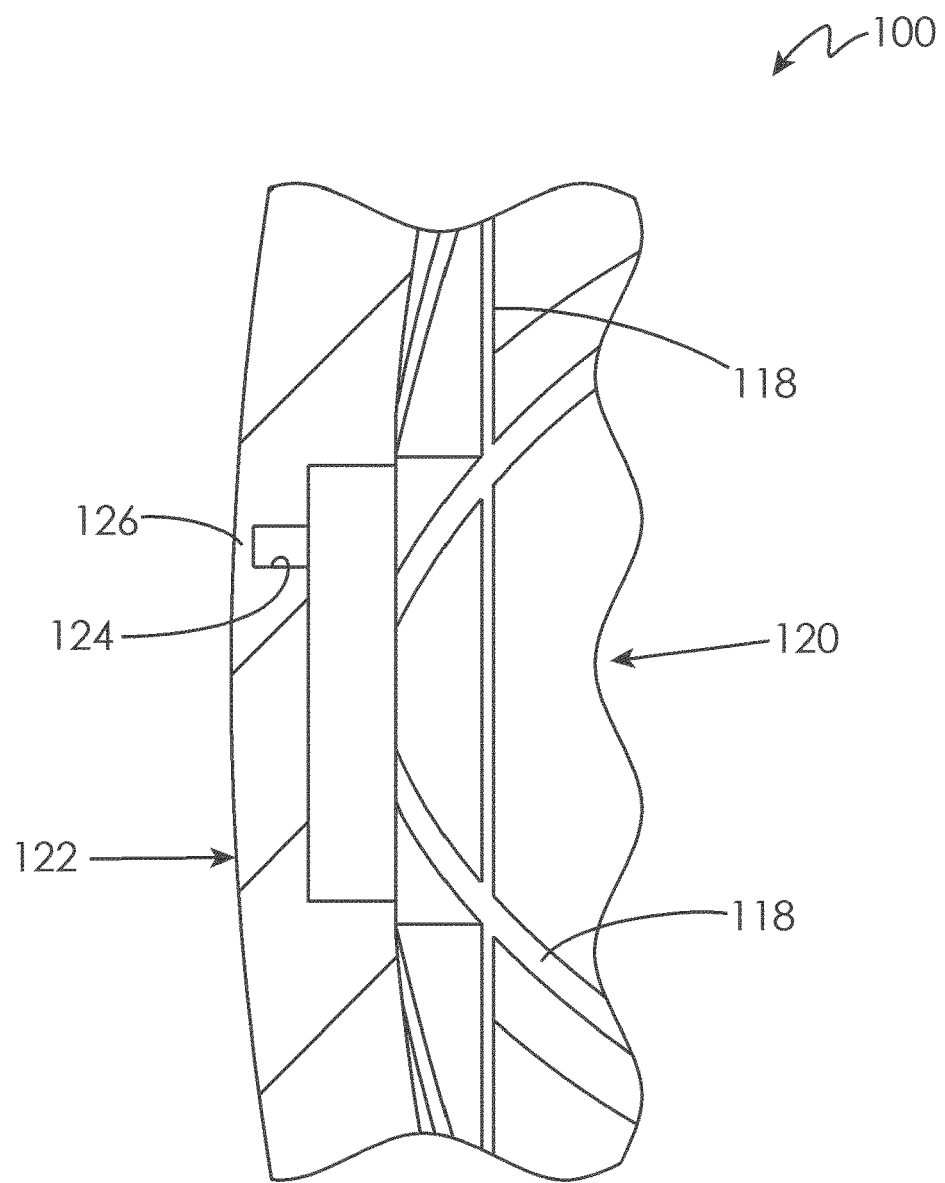
FIG. 5 is a schematic partial cross-sectional view of a gas turbine engine nosecap in an embodiment.
Figure 6:
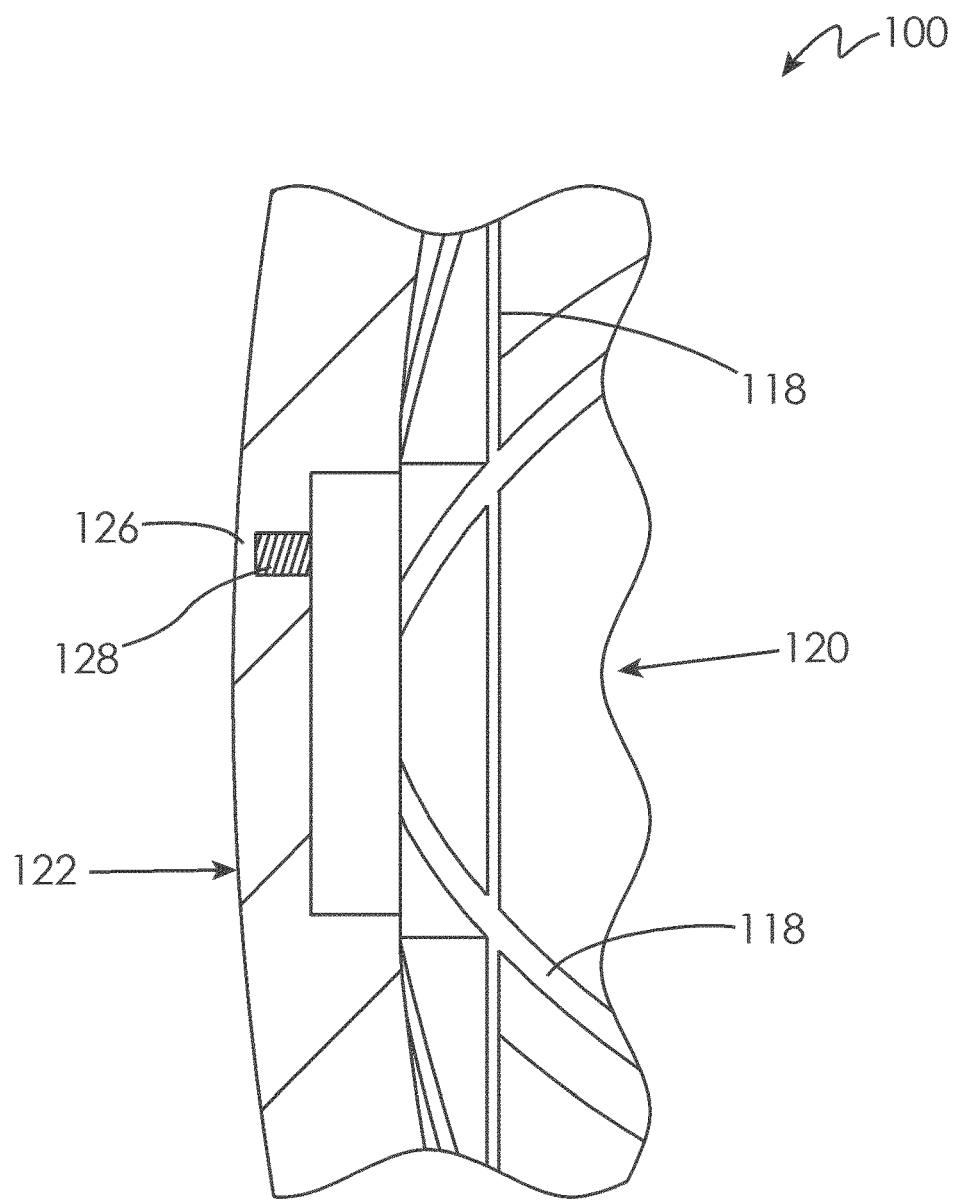
FIG. 6 is a schematic partial cross-sectional view of a gas turbine engine nosecap in an embodiment.

FIGS. 3-5 schematically illustrate a nosecap in an embodiment, indicated generally at 100. Unlike the nosecap 10, which is designed to resist erosion and withstand hail strike without sustaining damage or experiencing large deflections, the nosecap 100 is designed in an embodiment on the theory that a more compliant cap may be desirable in hail and birdstrike events. Because the nosecap 100 is compliant and able to withstand large deformations while absorbing a large amount of kinetic energy, it may have increased long term durability compared to the nosecap 10. Designing the nosecap 100 to withstand large deformations allows the nosecap 100 to be formed using an injection molding process using a material that is more compliant than the two-dimensional laminate used in the nosecap 10.

The nosecap 100 may be constructed from any desired injection moldable material, such as plastic, polycarbonate, polyetherimide (PEI), polyether ether ketone (PEEK), or nylon, to name just a few non-limiting examples. In other embodiments, the nosecap 100 may be constructed from relatively non-compliant materials, such as the poly-para-phenylene terephthalamide and fiberglass two-dimensional laminate construction used in the nosecap 10, which prevents the nosecap 100 from being formed in an injection molding process, but still allows the inclusion of other desirable features as discussed hereinbelow.

The nosecap 100 comprises a body 102 having at least one bolt hole 112 and bolt pocket 114 formed therein. The nosecap 100 maintains a similar interface to the spinner cone, using bolts (not shown) passing through bolt holes 112. However, the injection molding process allows more complex geometry to be added to the nosecap 100 without a significant cost penalty. For example, the nosecap 100 includes bolt pockets 114 that may be tailored to decrease the aerodynamic losses imparted due to the blunt wall of the bolt pocket 14. Each bolt pocket 114 includes a leading edge wall 115, a trailing edge wall 116, and a transition area 117 disposed between the leading edge wall 115 and the trailing edge wall 116. The transition area wall 117 is disposed at a fixed radius from a center of the bolt hole 112. The trailing edge wall 116 of the bolt pocket 114 may be formed as a streamlined curve to create a tear-drop shape for the bolt pocket 114 in an embodiment. The bolt pocket 14 of the nosecap 10 is symmetric about a plane 19 passing through the geometric center 18 of the nosecap 10 and passing through and dividing the bolt hole 12. On the other hand, the bolt pocket 114 of the nosecap 100 is asymmetric about a plane 119 passing through a geometric center 121 of the nosecap 100 body 102 and passing through and dividing the bolt hole 112. The nonlinear trailing edge wall 116 will present less of a circumferential dam to the air flow over the nosecap 100 and mitigate flow separation caused by the bolt pockets 14 of the nosecap 10. The asymmetric shape of the bolt pocket 114 also minimizes the bolt pocket erosion due to the lower vector sum impact velocity of forward motion and rotation.

As shown in FIGS. 4-5, internal ribs 118 may be included on the interior (aft side 120) of the nosecap 100 to increase stiffness. Circumferential and axial ribs 118 are illustrated as an example, but any desired ribbing configuration may be selected to meet design requirements.

The nosecap 100 may be provided without an erosion coating on its forward surface 122. In such an embodiment, the nosecap 100 is allowed to erode to an extent, after which the nosecap 100 may be replaced. In order to determine when the nosecap 100 exhibits sufficient wear to warrant replacement, partial through thickness wear indicator holes 124 may be formed in the interior (aft side 120) of the nosecap 100 in an embodiment. Wear indicator holes 124 extend from the aft side 120 but do not extend through the forward side 122 of the nosecap 100. Once the erodent in the atmosphere (sand, rain, debris, etc.) wears through the thinned region 126 on the forward side of the wear indicator holes 124 such that a through hole develops in the nosecap 100, the nosecap 100 may be replaced. In this way, the nosecap 100 may be designed to be disposable, but with the lower cost of the nosecap 100 the total cost for the nosecap 100 during the life of the engine will be less than the cost of the "permanent" nosecap 10.

To avoid any impact on the internal airflow balance inside the spinner cone and nosecap 100, or ingress of foreign material into the spinner cone and nosecap 100, the wear indictor holes 124 may be filled with a wear indicator material 128. The wear indicator material 128 will only be visible when the nosecap 100 forward surface 122 has eroded to a controlled extent. For example, the wear indicator material 128 may exhibit a different color or sheen than the material from which the nosecap 100 is formed, such as using the same material used to construct the nosecap 100 but in a different color. Alternatively, a second material may be used for the wear indicator material 128, such as a room temperature vulcanizing (RTV) silicone, to name just one non-limiting example. If an injection molding process is used to form the nosecap 100, the wear indicator material 128 may be inserted into the wear indicator holes 124 afterward.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A nosecap for a gas turbine engine, the nosecap comprising: an injection molded body configured to be disposed in a flowpath at a front end of the gas turbine engine, the injection molded body having a forward surface and an aft surface separated by an edge; and at least one wear indicator hole disposed in the aft surface, wherein the at least one wear indicator hole extends to a location aft of the forward surface.

2. The nosecap of claim 1, wherein the body is formed from a material selected from the group consisting of: plastic, polycarbonate, polyetherimide, polyether ether ketone, and nylon.

3. The nosecap of claim 1, further comprising at least one rib disposed on the aft surface.

4. The nosecap of claim 3, wherein the at least one rib comprises at least one circumferential rib and at least one axial rib.

5. The nosecap of claim 1, further comprising a wear indicator material at least partially filling the at least one wear indicator hole.

6. The nosecap of claim 5, wherein the wear indicator material is visually distinct from the body.

7. The nosecap of claim 5, wherein the wear indicator material comprises room temperature vulcanizing silicone.

8. The nosecap of claim 1, further comprising:
at least one bolt hole formed through the body; and
at least one bolt pocket, each at least one bolt pocket extending from the edge and surrounding a respective one of the at least one bolt hole;
wherein at least one of the at least one bolt pockets is asymmetric about a plane passing through a geometric center of the body and passing through and dividing the respective one of the at least one bolt hole.

9. The nosecap of claim 8, wherein:
each of the at least one bolt pockets comprises a leading edge wall, a trailing edge wall, and a transition area wall disposed between the leading edge wall and the trailing edge wall; and
the trailing edge wall is curved.

10. A nosecap for a gas turbine engine, the nosecap comprising: a body configured to be disposed in a flowpath at a front end of the gas turbine engine, the body having a forward surface and an aft surface separated by an edge; at least one bolt hole formed through the body; and at least one bolt pocket located on the forward surface, each at least one bolt pocket extending from the edge and surrounding a respective one of the at least one bolt hole; and wherein at least one of the at least one bolt pockets is asymmetric about a plane passing through a geometric center of the body and passing through and dividing the respective one of the at least one bolt hole, wherein the plane is parallel to a central longitudinal axis of the gas turbine engine when the nose cap is secured to the gas turbine engine.

11. The nosecap of claim 10, wherein:
each of the at least one bolt pockets comprises a leading edge wall, a trailing edge wall, and a transition area wall disposed between the leading edge wall and the trailing edge wall; and
the trailing edge wall is curved.

12. The nosecap of claim 10, wherein the body is formed from a material selected from the group consisting of: plastic, polycarbonate, polyetherimide, polyether ether ketone, and nylon.

13. The nosecap of claim 10, further comprising at least one rib disposed on the aft surface.

14. The nosecap of claim 13, wherein the at least one rib comprises at least one circumferential rib and at least one axial rib.

15. The nosecap of claim 10, further comprising a wear indicator material at least partially filling the at least one wear indicator hole.

16. The nosecap of claim 15, wherein the wear indicator material is a different color than the body.

17. The nosecap of claim 15, wherein the wear indicator material comprises room temperature vulcanizing silicone.

18. The nosecap of claim 10, wherein the body comprises an injection molded body.

19. A nosecap for a gas turbine engine, the nosecap comprising: a body configured to be disposed in a flowpath at a front end of the gas turbine engine, the body having a forward surface and an aft surface separated by an edge; at least one bolt hole formed through the body; at least one bolt pocket located on the forward surface, each at least one bolt pocket extending from the edge and surrounding a respective one of the at least one bolt hole, and wherein at least one of the at least one bolt hole pockets is asymmetric about a plane passing through a geometric center of the body and passing through and dividing the respective one of the at least one bolt hole; and at least one indicator hole disposed in the aft surface, wherein the at least one wear indicator hole does not extend through the forward surface.

20. The nosecap of claim 19, wherein: each of the at least one bolt hole pockets comprises a leading edge wall, a trailing edge wall, and a transition area wall disposed between the leading edge wall and the trailing edge wall; and the trailing edge wall is curved.

* * * * *